UNITED STATES PATENT OFFICE.

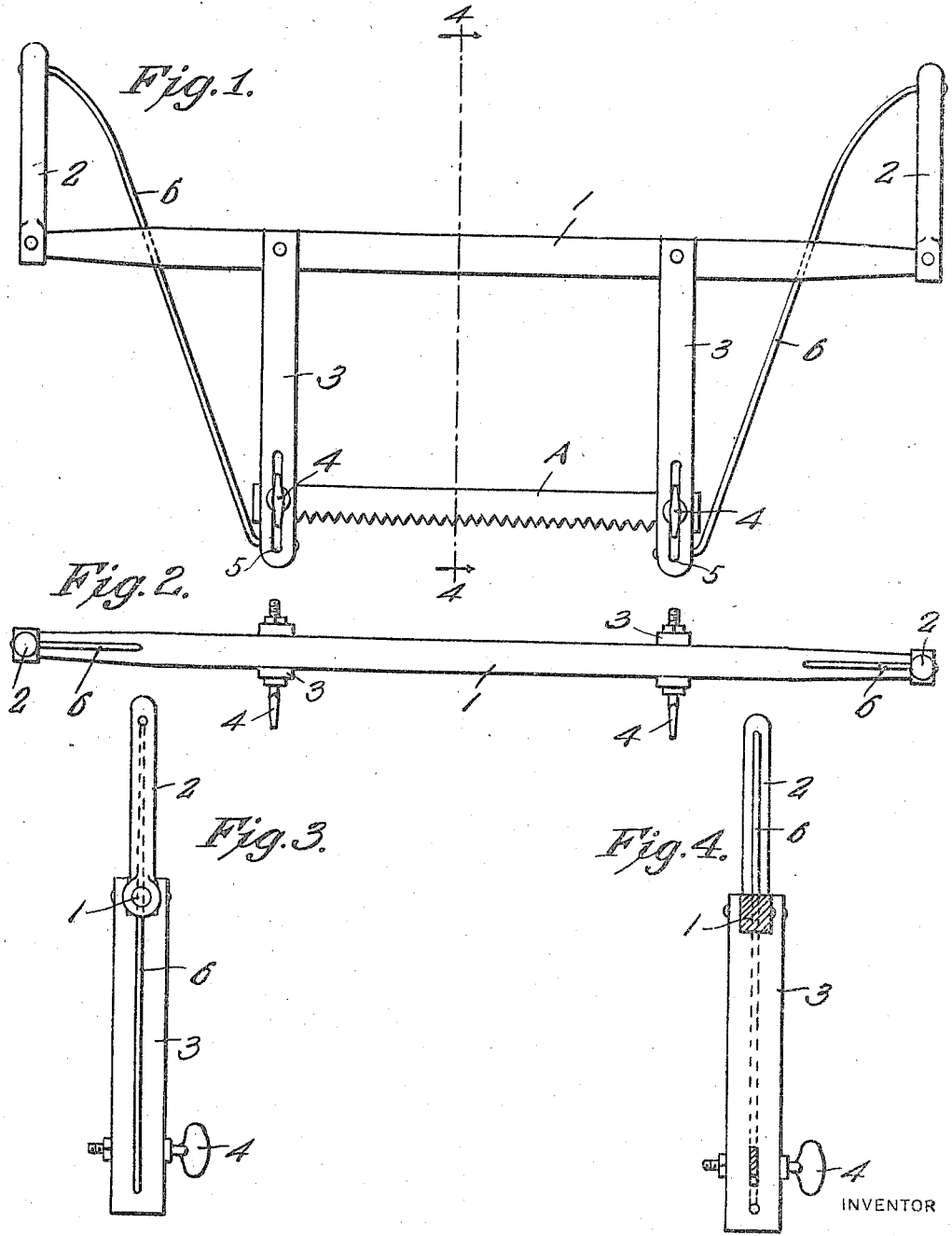

THOMAS J. ELLIS, OF LODA, ILLINOIS.

CROSSCUT-SAW FRAME.

1,264,036.	Specification of Letters Patent.	Patented Apr. 23, 1918.

Application filed August 31, 1917. Serial No. 189,148.

*To all whom it may concern:*

Be it known that I, THOMAS J. ELLIS, a citizen of the United States, residing at Loda, in the county of Iroquois and State of Illinois, have invented certain new and useful Improvements in Crosscut-Saw Frames, of which the following is a specification.

This invention relates to a cross cut saw frame and more particularly to a frame structure for supporting a cross cut saw such as commonly used for sawing logs and timber.

The primary object of the invention is to provide a frame of this character that will have its handle provided at points whereby two workmen may grasp the handle to operate the saw without the necessity of stooping or kneeling as is so often the case with the ordinary cross cut saw which has handles attached at its ends.

A further object of this invention is to provide a cross cut saw frame of this character adapted to be operated by a person at each end of the frame and constructed to permit the operator to operate the saw in a straight line, while canting of the saw may be prevented thus assuring a perfectly straight cut.

A further object of the invention is to provide a handle for a cross cut saw which consists of comparatively few parts and is simple in construction, but durable and well adapted to withstand the rought usage to which devices of this character are ordinarily subjected.

For a full description of the invention and the advantages and merits thereof, reference is to be had to the following description and the accompanying drawings, wherein is illustrated the preferred form of my invention, in which:

Figure 1 is a side elevation of the frame constructed in accordance with my invention and showing a cross cut saw attached.

Fig. 2 is a top plan view.

Fig. 3 is an end elevation.

Fig. 4 is a section on the line 4—4 of Fig. 1.

Referring to the drawing by numerals, an extension bar 1, is provided and has right angularly disposed handles 2 attached at its ends. These handles project upwardly above the extension bar 1 so that they may be conveniently grasped by the operators of the saw. Retaining bars 3 are attached to the extension bar 1 and depend from the same for supporting a cross cut saw A. The bars 3 are spaced apart for a distance equal to the length of the cross cut saw and the ends of the saw are attached to the end of the retaining bar 3 by means of set screws 4. The latter are projected laterally through convenient openings formed in the end of the bars 3 and also through openings in the ends of the saw blade A. The openings 5 in the bars 3 through which the set screws 4 are projected are in the form of slots and it will be observed that the saw may be adjusted vertically by loosening the screws and moving the saw upwardly or downwardly as desired.

For the purpose of bracing the frame I have provided truss rods 6 and it will be noted that one end of each truss rod is attached to the end of the bars 3 and is extended upwardly at an angle and through a convenient opening in the projecting end of the extension bar 1 from which point the rod 6 is curved to be attached to the upper end of the corresponding handle 2. The handles are rigidly held so that the proper motion can be given to saw blade when the operators reciprocate the saw through a log or piece of timber. Since the frame is higher than the saw blade and the handles project upwardly from the same it will be apparent that the operators need not stoop or kneel as they may grasp the handle and operate the saw while standing in a practically upright position.

From the foregoing it will be observed that a very simple and durable frame has been provided the details of which embody the preferred form. I desire it to be understood however that minor details may be changed without departing from the spirit of the invention or the scope of the claim hereunto appended:

A saw frame of the character described comprising an extension bar having a pair of retaining bars fixed thereto, and spaced from the ends of the extension bar whereby the said ends project beyond the end of the said retaining bars, handles attached to the terminals of the said projected portions of the extension bar and extending upwardly at right angles to the bar, the said extended portions of the said extension bar having openings arranged obliquely, obliquely disposed truss rods extended through the openings in the extension bar and having their upper ends fixed to the ends of the said handle and their lower ends joined to the said retaining bars, and a saw blade carried by the said retaining bars at points near the juncture of the said truss rods with the said retaining bar.

In testimony whereof I affix my signature in presence of two witnesses.

THOMAS J. ELLIS.

Witnesses:
ADDISON G. CURTIS,
CHARLES E. HEALEY.

Copies of this patent may be obtained for five cents each, by addressing the "Commissioner of Patents, Washington, D. C."